US006991194B2

(12) United States Patent
Stratico et al.

(10) Patent No.: US 6,991,194 B2
(45) Date of Patent: Jan. 31, 2006

(54) NEEDLE SOLUTION FOR COIL STRATIFICATION

(75) Inventors: Gianfranco Stratico, Siena (IT); Antonio Lumini, Florence (IT); Simone Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 71 days.

(21) Appl. No.: 10/458,921

(22) Filed: Jul. 21, 2005

(65) Prior Publication Data

US 2004/0035974 A1 Feb. 26, 2004

Related U.S. Application Data

(60) Provisional application No. 60/389,529, filed on Jun. 17, 2002.

(51) Int. Cl.
*H02K 15/085* (2006.01)

(52) U.S. Cl. ...................................... 242/432.5; 29/596

(58) Field of Classification Search ............. 242/432.2, 242/432.3, 432.4, 432.5, 434.7, 434.8; 29/596
See application file for complete search history.

(56) References Cited

U.S. PATENT DOCUMENTS 3,081,043 A * 3/1963 Morrill et al. ........... 242/432.4
3,822,830 A * 7/1974 Peters ..................... 242/432.5
3,995,785 A * 12/1976 Arick et al. ............. 242/432.4
4,762,283 A 8/1988 Sabatino
4,858,835 A 8/1989 Luciani et al.
4,991,782 A * 2/1991 Luciani ................... 242/432.4
5,273,223 A * 12/1993 Tsugawa .................. 242/432.4
5,875,988 A * 3/1999 Hashimoto ............... 242/434.8
6,098,912 A * 8/2000 Noji ........................ 242/432.5
6,254,027 B1 * 7/2001 Kunou .................... 242/432.4
6,533,208 B1 3/2003 Becherucci et al. ..... 242/432.4
6,622,654 B2 * 9/2003 Fasino ....................... 119/57.9
6,622,955 B2 9/2003 Stratico et al. .......... 242/432.4

* cited by examiner

*Primary Examiner*—Emmanuel Marcelo
(74) *Attorney, Agent, or Firm*—Fish & Neave IP Group of Ropes & Gray LLP; Robert R. Jackson; Patrick J. Zhang

(57) ABSTRACT

An improved needle solution is provided for winding wire coils onto dynamo-electric machine components such as electric motor stators and armatures. The improved needle solution decreases the opportunity for collision between the needle apparatus and the machine component onto which wire coils are being wound and enables the winding of machine components with small interior hollows that may not allow conventional needle solutions to pass through. The improved needle solution further provides increased accuracy in wire coil stratification by stabilizing the stratification motion of the apparatus using guide structures that engage the needle arm. The needle solution further provides open access to the wire being fed through the apparatus for winding onto the machine component. Multiple needles may be accommodated by the apparatus to simultaneously wind multiple wire coils onto a machine component using the improved needle solution.

21 Claims, 6 Drawing Sheets

NEEDLE SOLUTION FOR COIL STRATIFICATION

CROSS REFERENCE TO RELATED APPLICATIONS

This application claims priority from U.S. provisional application No. 60/389,529, filed Jun. 17, 2002, which is hereby incorporated by reference herein in its entirety.

BACKGROUND OF THE INVENTION

The present application concerns improved solutions for winding coils of wire onto dynamo-electric machine components such as stators and armatures. More particularly, the solutions of the present application provide improved needle equipment for accomplishing the winding of wire coils around poles of a stator core where the wire turns of the coils need accurate stratification.

Accurate stratification of the wire turns normally requires placing wire turns in predetermined positions along the radially extending sides of the poles. The solutions of this invention make it possible to wind coils at high winding speeds without incurring vibration of the wire dispensing needles that cause unwanted wire turn disposition and wire tension variation within the coils.

Furthermore, the solutions of this invention allow wire dispensing needles to move with respect to the stator core in extremely narrow gaps (e.g., the gaps existing between poles of the stator core) at high speed and with a lower risk of the wire dispensing needles colliding with the surrounding parts. Using the solutions of this invention, these achievements are possible for stator cores having very small hollow interiors that would not allow passage of conventional needle equipment during relative winding motion with respect to the stator core.

These and other objects of the present invention will be more apparent in view of the following drawings and detailed description.

BRIEF DESCRIPTION OF THE DRAWINGS

Non-limiting embodiments of the present invention are described hereinafter with reference to the accompanying drawings in which.

DETAILED DESCRIPTION OF THE INVENTION

The solutions of the present application are related to those described in Becherucci et al. U.S. Pat. No. 6,533,208 and Stratico et al. U.S. patent application Ser. No. 09/960,550, filed Sep. 20, 2001, both of which are hereby incorporated by reference herein in their entireties.

Figure 1:
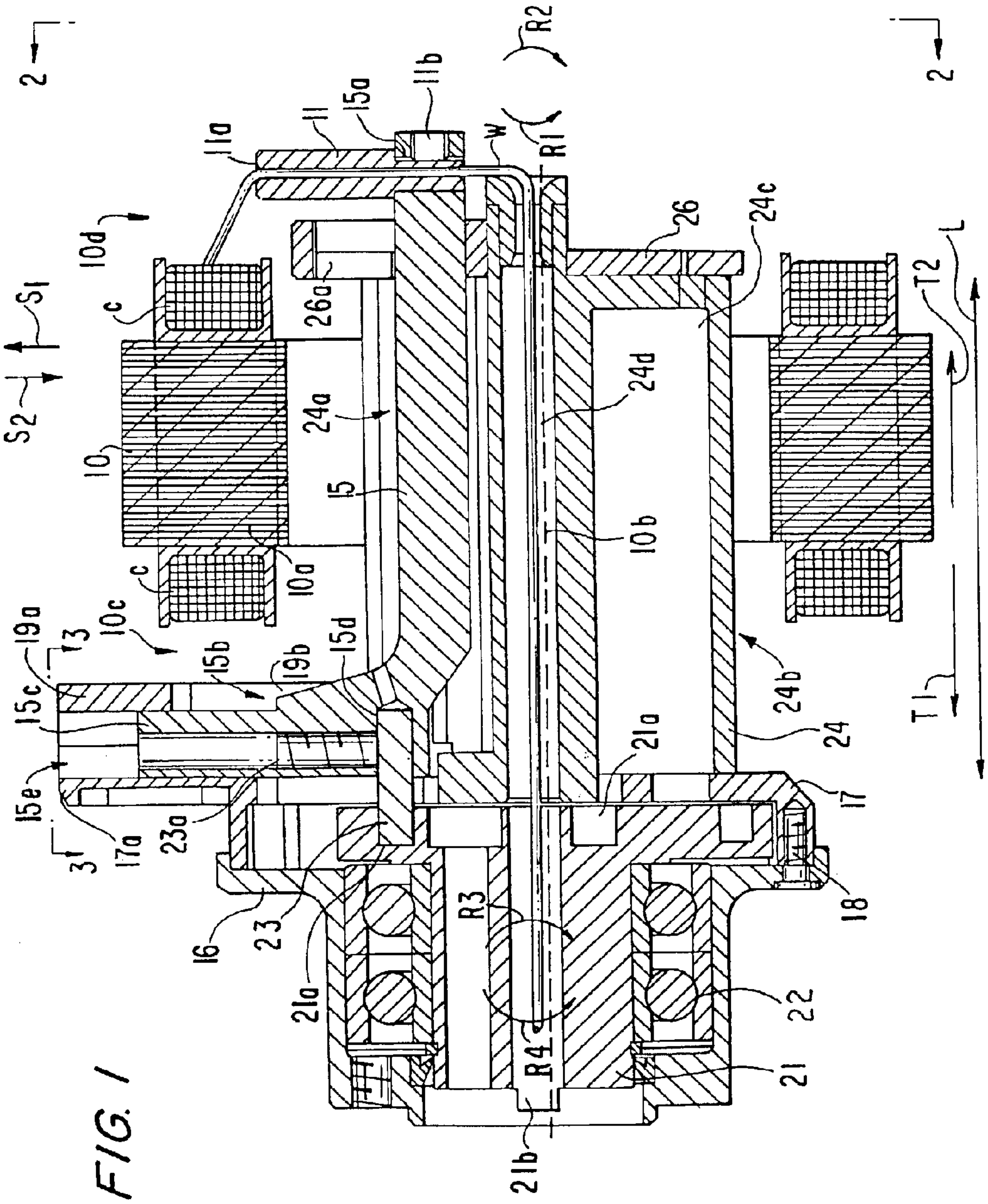
FIG. 1 is a partial section view of one embodiment of the present invention as seen from direction 1—1 of FIG. 2.

Stator core 10 of FIG. 1 is shown sectioned and positioned for winding with wire W to form coils C extending around poles 10*a*. Needle 11 is a hollow cylindrical member for allowing passage of wire W so that wire W is delivered from extremity 11*a* of needle 11. Needle 11 needs to be provided with relative motions T1, T2, R1, R2, S1 and S2 with respect to stator core 10 in order to wind wire W to form coils C. Relative motions T1 and T2 are forward and backwards translations which cause needle 11 to traverse the internal hollow portion of stator core 10. Rotations R1 and R2 are rotary motions with respect to central axis 10*b* of the stator core, and are accomplished when the needle has been brought beyond the end extremities 10*c* and 10*d* of the stator core.

As is well known to those in the art, a combination of motions in a progressive order (e.g., first T1, then R1, then T2 and then R2) cause the needle to wind wire W around a pole for one turn of the coil. Translation motions S1 or S2, which are usually perpendicular to translations T1 and T2, are normally accomplished to obtain stratification of the wire turns. The length and occurrence of motions S1 or S2 is usually programmable and dependent on the desired turn disposition around the pole.

Figure 2:
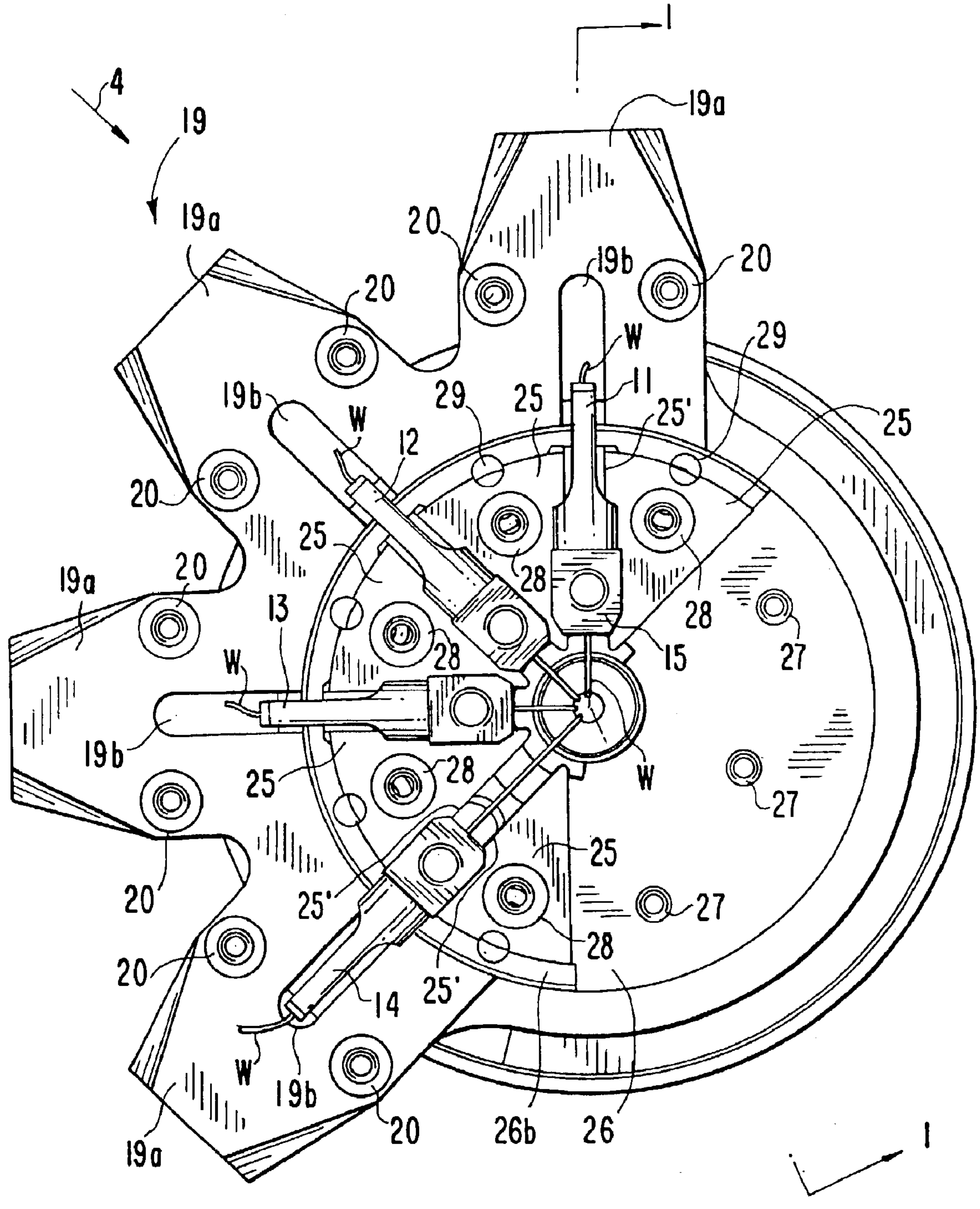
FIG. 2 is an axial end view of one embodiment of the present invention as seen from direction 2—2 of FIG. 1 that omits some parts shown in FIG. 1 for clarity.

FIG. 2 shows that the present invention makes it possible to simultaneously wind a plurality of poles using additional needles such as needles 12, 13 and 14. Each of needles 11, 12, 13 and 14 is normally provided with the motions previously described for needle 11. Each needle may wind a respective coil C around a respective pole 10*a* of the stator core by delivering wire W in the manner described for needle 11. Note that FIG. 2 shows needles 11, 12, and 13 at their most radially proximal locations and needle 14 at its most radially distal location. This is a composite illustration for the purpose of showing the range of motion of needles 11, 12, 13, and 14.

As shown in FIG. 1, needle 11 can be fixed perpendicularly to needle arm 15 by receiving the radially proximal end of needle 11 in bore 15*a* of needle arm 15. Grub screw 11*b* can be used to secure the radially proximal end of needle 11 in bore 15*a*. Needle arm 15 normally extends parallel to longitudinal axis 10*b* of the stator core as shown in FIG. 1. Extreme portion 15*b* of the needle arm can be spaced from needle 11 a distance L sufficient to allow needle 11 to be outside the stator core at one end of the stator core (e.g., end 10*d* of FIG. 1) while extreme portion 15*b* is outside the opposite end of the stator core (e.g., end 10*c* of FIG. 1). This condition is represented in FIG. 1 and normally corresponds to the end of a translation stroke like T2 and just before a rotation like R2. Extreme portion 15*b* includes a guide portion 15*c*. Guide portion 15*c* guides needle arm 15 during stratification motions like S1 and S2, as will be more fully described in the following.

External member 16 can be provided with relative rotation motions R1 and R2 with respect to stator core 10. Guide support member 17 is flanged to the end of external member 16 by means of bolts 18. Guide support member 17 can have upright portions 17*a* to receive guide portion 15*c* of needle arm 15. Cover member 19 can be flanged to guide support member 17 by means of bolts 20. Cover member 19 can have upright portions 19*a* configured to be adjacent and forward of upright portions 17*a*. When cover member 19 is flanged to guide support member 17, portions 17*a* and 19*a* can form a guide way 15*e* that receives guide portion 15*c*.

Guide way 15*e* can be configured perpendicular to longitudinal axis 10*b* in order to guide stratification motions S1 and S2. Upright portions 19*a* can be provided with apertures 19*b* to allow passage of needle arm 15 through cover member 19 during stratification motions.

Disk member 21 can be assembled coaxially within external member 16, and can be provided with relative rotation motions R3 or R4 with respect to external member 16. Bearings 22 can be provided between disk member 21 and external member 16 to allow the relative rotation motions R3 or R4 around axis 10*b*. The frontal end of disk member 21 can be provided with spiral grooves 21*a*, which can act as constraining guide ways for pin 23 partially received therein, as shown in FIG. 1. Pin 23 is fixed to needle arm 15 by being also partially received in bore 15*d* of needle arm 15. A grub screw 23*a*, located in the interior of guide portion 15*c* can secure pin 23 in bore 15*d*. By means of this assembly in which pin 23 is engaged in a spiral groove 21*a*, and by means of the relative motions R3 and R4, the needle arm is driven to accomplish stratification motions S1 and S2.

As shown in FIG. 2, lid member 26 is flanged to casing member 24 by means of bolts 27. Casing member 24 is flanged to guide support member 17 by means of bolts (not shown). Lid member 26 has slits 26*a* (shown in FIG. 1) for receiving needle arms 15. Slits 26*a* are in directions parallel to stratification motions S1 and S2 of needle arms 15 to enable stratification motions S1 and S2 to occur. Circular rib 26*b* reinforces lid member 26. Slits 26*a* (shown in FIG. 1) also allow needle arms 15 to project axially beyond lid member 26.

FIG. 2 shows that inserts 25 are bolted to the end face of lid member 26 by means of bolts 28. Inserts 25 partially close slits 26*a* with their sides 25' which become extremely proximate to needle arms 15. In this way inserts 25 act as lateral support surfaces for needle arms 15, and at the same time guide the unimpeded motion of needle arms 15 in directions parallel to the stratification motions S1 and S2. Pins 29 act as anti-rotation members for inserts 25 in order to keep the sides 25' of inserts 25 parallel to the sides of needle arms 15.

FIG. 1 shows that casing member 24 can have an empty area 24*a* for allowing passage of needle arm 15, while casing member 24 needs to be materially structured in area 24*b* to provide sufficient extension length to reach the end of the apparatus where lid member 26 needs to be flanged by way of bolts 27. This extension length guarantees that a portion of the needle equipment for the stratification motion is outside of one end of the stator core (e.g., end 10*c* in FIG. 1) when needle 11 is beyond the opposite end of the stator core (e.g., end 10*d* in FIG. 1) at the end of a translation motion such as T2. This condition is particularly required when the interior of the stator is not large enough to allow passage of a portion of the needle equipment as shown in FIG. 1.

Bore 24*c* of member 24 can be foreseen to reduce the weight of member 24. Wires W run through hollow interiors 24*d* (of member 24) and 21*b* (of member 21) to reach needle 11. Wire W can be easily inserted through needles 11 by an operator because of the free access area that exists below the end of needle 11.

Figure 3:
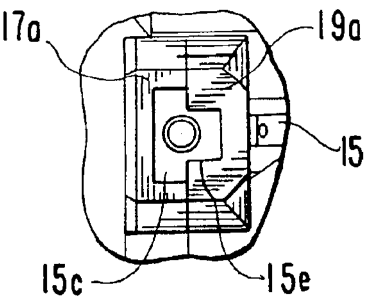
FIG. 3 is a view of the guide structure of one embodiment of the present invention from direction 3—3 of FIG. 1.
Figure 4:
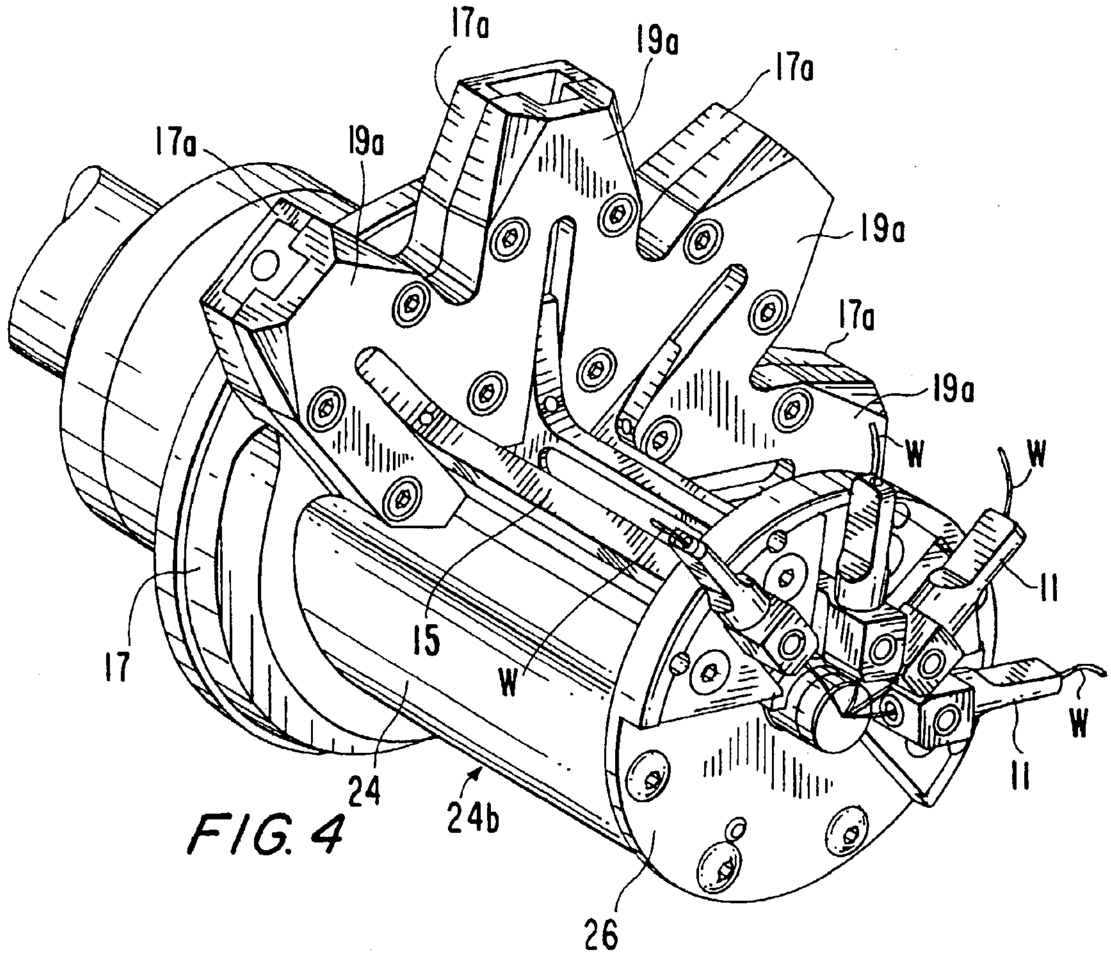
FIG. 4 is a partial perspective view of one embodiment of the present invention as seen from direction 4 of FIG. 2.

FIGS. 3 and 4 show how multiple needles can be arranged to wind wires W to form coils C around poles like 10*a*. Each needle will be assembled with parts and principles that can be identical to those described for needle 11. In this case, disk member 21 can be provided with a spiral slot 21*a* for each of pins 23 to cause each of needles 11, 12, 13, and 14 to accomplish stratification motions S1 and S2 during relative rotations R3 and R4 of disk member 21 with respect to the external member. Alternately, multiple pins 23 may be engaged within a single spiral slot 21*a* to accomplish sequential stratification motions for the multiple needles. Note, similar to FIG. 2, FIG. 4 is a composite illustration for the purpose of showing the range of motion of needles 11, 12, 13, and 14.

To accomplish relative motions T1, T2, R1 and R2 of the needles with respect to the stator core, either stator core 10, or external member 16 can be provided with any of such motions. Motions T1, T2, R1, and R2 of the stator core or external member 16 can be achieved using apparatus described in the previously incorporated references. It will be appreciated that each needle 11 may deliver more than one wire W by passing additional wires W through hollow portions 21*b*, 24*d*, and needle 11.

In an alternate embodiment, the needle solution provides open access to the wires W that need to be fed through the needles 50 from where they are dispensed for placement around the poles of the stator core.

Figure 5:
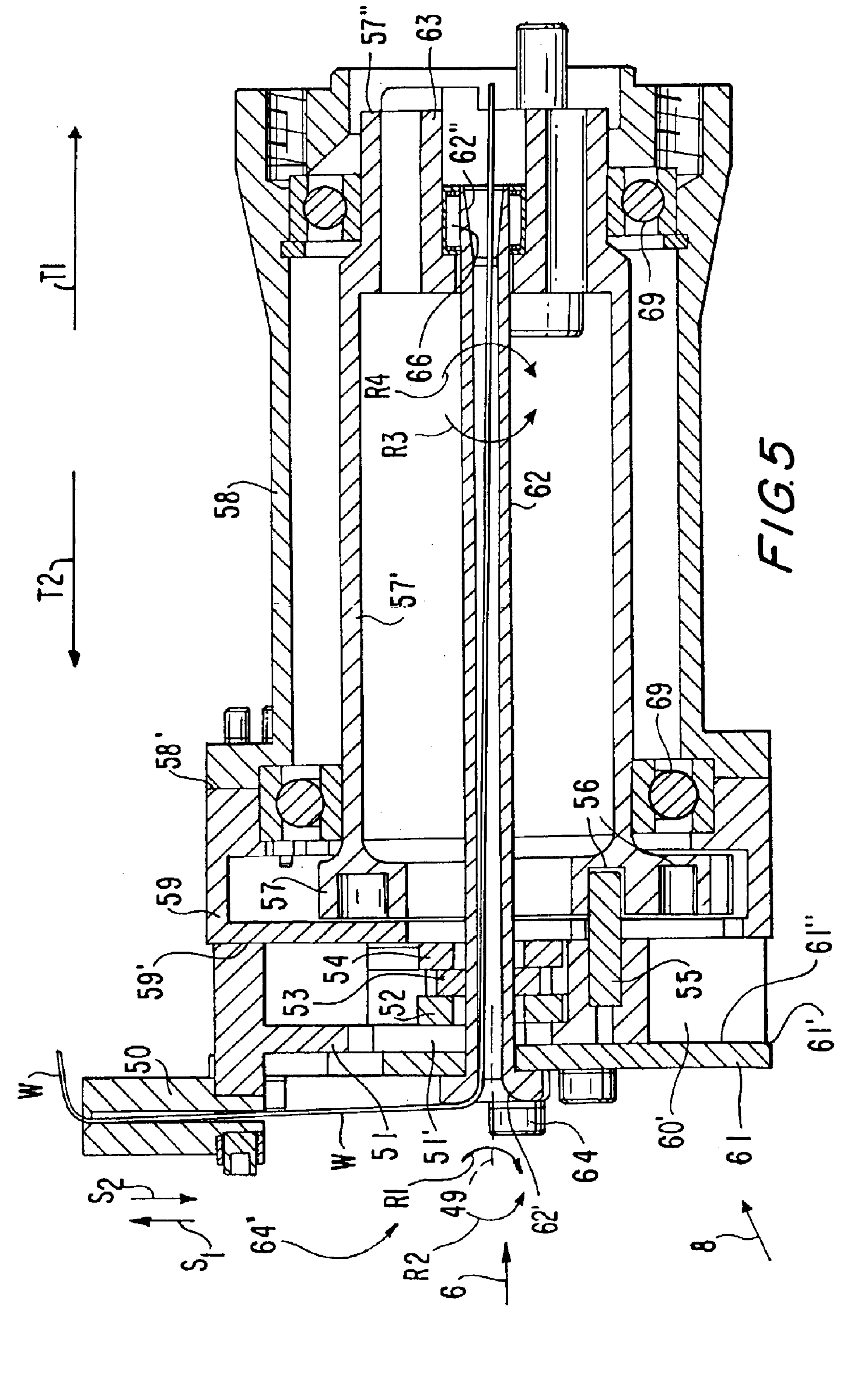
FIG. 5 is a partial section view of an alternate embodiment of the present invention as seen from direction 5—5 of FIG. 6.
Figure 6:
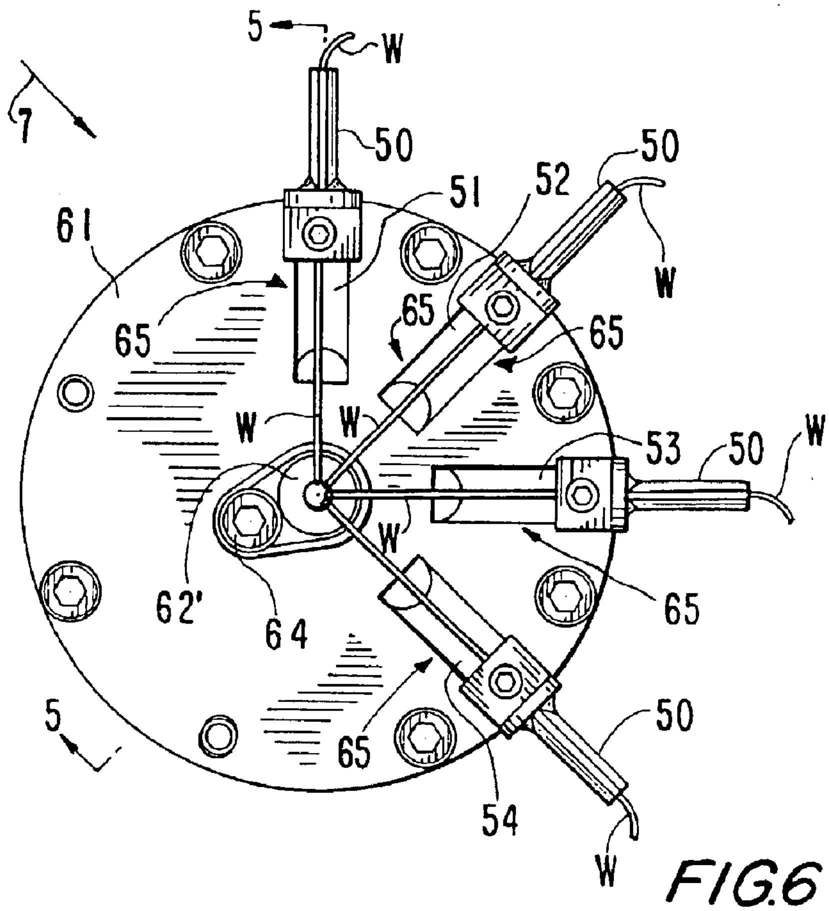
FIG. 6 is an axial end view of the alternate embodiment shown in FIG. 5 from direction 6 of FIG. 5.
Figure 7:
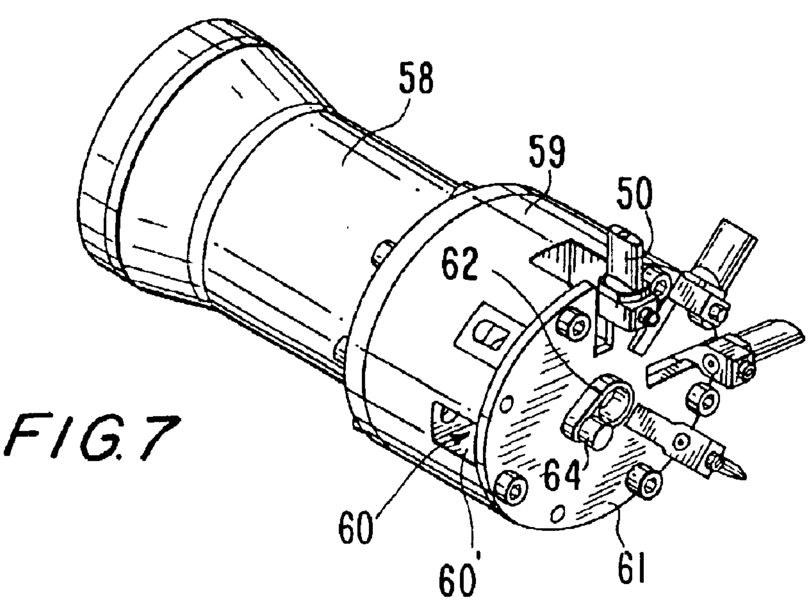
FIG. 7 is a partial perspective view of the alternate embodiment from direction 7 of FIG. 6.
Figure 8:
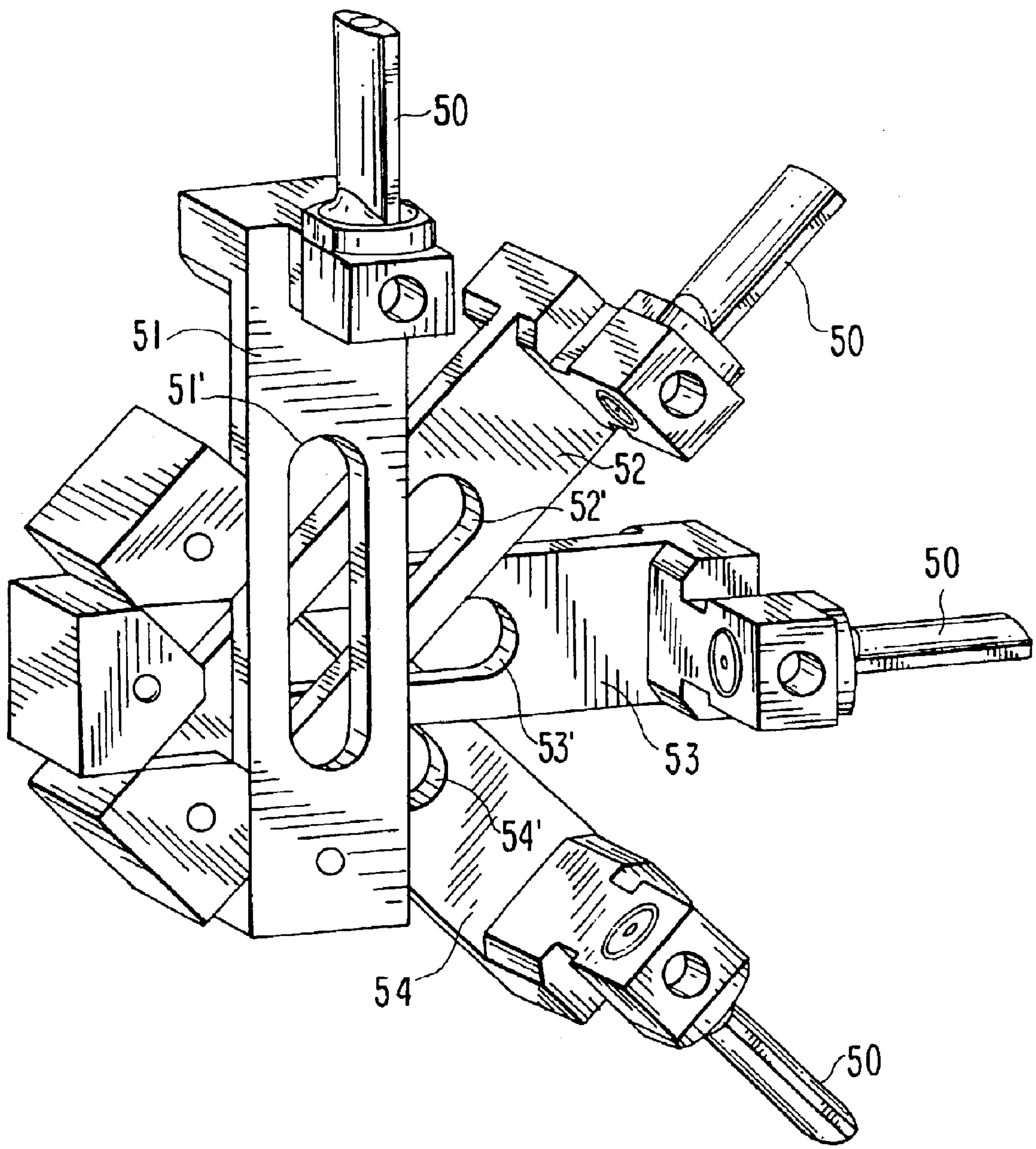
FIG. 8 is a perspective view of the needle support structure from direction 8 of FIG. 5 that omits all other elements of the apparatus for clarity.

As shown in FIG. 5, needles 50 extend from respective portions like 51, 52, 53 and 54, which are similar to trunk portions 315, 316 and 317 of the previously incorporated Stratico et al. U.S. patent application Ser. No. 09/960,550. Portions like 51, 52, 53 and 54 have pins like 55 which engage in respective spiral grooves like 56 of disk member 57. Portions 51, 52, 53, and 54 also have respective apertures 51', 52', 53', and 54' within their respective bodies (shown in FIG. 8). Disk member 57 extends rearwards by means of a cylindrical portion 57'. Cylindrical portion 57' and disk 57 are supported on bearings 69 and are capable of relative rotations R3 and R4 around longitudinal axis 49 with respect to casing tube 58.

Casing tube 58 is coaxial and external to cylindrical portion 57' and is provided with relative reciprocations T1, T2, and relative rotations R1 and R2 with respect to the poles of the stator core. A cylindrical support member 59 is coupled to casing tube 58 by means of a bolted flange surface connection in 58'. Respective grooves 60 of support member 59 receive portions like 51, 52, 53 and 54. The sides like 60' of grooves 60 act as guide surfaces for portions like 51, 52, 53 and 54 when radial stratification motions like S1 and S2 are required on behalf of needles 50 to stratify the wires. Lid 61 is connected to support member 59 by means of a bolted flange connection at location 61' in order to stack portions like 51, 52, 53 and 54 between face 59' of support member 59 and lid 61. More particularly, face 59' and surface 61" of lid 61 act as shoulder surfaces to locate portions like 51, 52, 53 and 54 along axis 49. Lid 61 is provided with slits 65, the sides of which allow passage of portions like 51, 52, 53 and 54 to accomplish radial stratification motions like S1 and S2.

Tube 62 is made to pass through apertures 51', 52', 53', and 54' (shown in FIG. 8) of respective portions 51, 52, 53 and 54 in order to reach terminal end 57" of portion 57'. Disk 57 is caused to rotate with respect to support member 59 by means of equipment like those described in the previously incorporated references. End 62" of tube 62 is received in bearing 66, which is disposed within an inner portion 63 of portion 57'. This configuration allows relative rotation of tube 62 with respect to disk member 57 and portion 57'. Tube 62 is fixed to lid 61 by means of bolt 64. Wires W run through tube 62 to reach needles 50. Tube 62 has flared end portion 62' to provide smooth running of wires W. By means of the foregoing arrangement of the needle solution, open access is provided to the wires at area 64'.

Thus, improved needle solutions for winding wire coils and stratifying wire turns are provided. One skilled in the art will appreciate that the present invention can be practiced by other than the described embodiments, which are presented for the purpose of illustration and not of limitation.

What is claimed is:

1. An apparatus for winding wire coils onto a dynamo-electric machine component comprising:

a first actuation mechanism configured to produce relative reciprocation between a needle arm and a central hollow core of the machine component, the needle arm reciprocating through the hollow core;

a second actuation mechanism configured to translate the needle arm substantially perpendicular to the relative reciprocation motion to stratify the wire coils being wound onto the component; and a guide structure configured to guide the needle arm during the translation motion to move substantially perpendicular to the relative reciprocation motion, wherein the guide structure accomplishes the relative reciprocation motion along with the needle arm and remains outside of the hollow core during the winding of the wire coils.

2. The apparatus of claim 1 wherein the guide structure comprises a radially extending slot that receives a portion of the needle arm.

3. The apparatus of claim 1 wherein the second actuation mechanism comprises an actuating element in engaging communication with the needle arm, wherein the translation motion is actuated through relative rotation between the actuating element and the needle arm.

4. The apparatus of claim 3 wherein the actuating element is a disk having a spiral track in engaging communication with the needle arm to actuate the translation motion.

5. The apparatus of claim 1 wherein the second actuation mechanism is configured to operate independently of the first actuation mechanism.

6. The apparatus of claim 1 wherein the guide structure is substantially disposed between the needle arm and the second actuation mechanism.

7. The apparatus of claim 1 further comprising supporting structure at least partially disposed circumferentially about the needle arm and configured to stabilize movements of the needle arm.

8. The apparatus of claim 7 wherein the supporting structure is further configured to enter the hollow core along with the needle arm during winding of the wire coils.

9. The apparatus of claim 7 wherein the supporting structure comprises a hollow tube extending through the second actuation mechanism and the guide structure to feed wire to a needle disposed near a distal end of the needle arm.

10. The apparatus of claim 9 wherein the supporting structure further comprises an opening adjacent a distal end of the supporting structure to provide open access to the wire being fed through the hollow tube.

11. The apparatus of claim 1 wherein multiple needle arms are coupled to the actuation mechanisms and used to simultaneously wind multiple poles of the machine component.

12. The apparatus of claim 11 wherein each needle arm is received in a respective radially extending slot of the guide structure.

13. A method for winding wire coils onto a dynamo-electric machine component comprising:

producing relative reciprocation between a needle arm and a central hollow core of the machine component, the needle arm reciprocating through the hollow core;

translating the needle arm substantially perpendicular to the relative reciprocation motion to stratify the wire coils being wound onto the component; and guiding the needle arm during the translation motion with guide structure to move the needle arm substantially perpendicular to the relative reciprocation motion, wherein the guide structure accomplishes the relative reciprocation motion along with the needle arm and remains outside of the hollow core during the winding of the wire coils.

14. The method of claim 13 wherein the guiding the needle arm during the tranlation motion comprises receiving a portion of the needle arm within a radially extending slot.

15. The method of claim 13 wherein translating the needle arm comprises producing relative rotation between the needle arm and an actuating element in engaging communication with the needle arm.

16. The method of claim 13 wherein the translation of the needle arm is achieved independently of the relative reciprocation.

17. The method of claim 13 further comprising stabilizing movements of the needle arm with supporting structure at least partially disposed circumferentially about the needle arm, wherein the supporting structure is configured to enter the hollow core along with the needle arm during winding of the wire coils.

18. The method of claim 17 further comprising feeding wire to a needle disposed near a distal end of the needle arm through a hollow tube that extends through the guide structure and the supporting structure.

19. The method of claim 18 further comprising providing open access to the wire being fed through the hollow tube through an opening adjacent a distal end of the supporting structure.

20. An apparatus for winding wire coils onto a dynamo-electric machine component comprising:

a plurality of needle supports respectively disposed in adjacent parallel planes, the needle supports respectively supporting a plurality of wire dispensing needles collectively disposed in a single plane parallel to the adjacent parallel planes of the needle supports;

an actuation mechanism configured to translate the needles substantially parallel to the adjacent parallel planes to stratify the wire coils being wound onto the machine component; and wherein wires being fed to the needles pass substantially perpendicularly through the parallel adjacent planes of the needle supports to reach the plane of the needles, and wherein the wires are substantially redirected in the plane of the needles to be received by the needles, wherein the needle supports are apertured to allow passage of the wires through the parallel adjacent planes of the needle supports.

21. An apparatus for winding wire coils into dynamo-electric machine component comprising:

a plurality of needle supports respectively disposed in adjacent parallel planes, the needle supports respectively supporting a plurality of wire dispensing needles collectively disposed in a single plane parallel to the adjacent parallel planes of the needle supports;

an actuation mechanism configured to translate the needles substantially parallel to the adjacent parallel planes to stratify the wire coils being wound onto the machine component;

wherein wires being fed to the needles pass substantially perpendicularly through the parallel adjacent planes of the needle supports to reach the plane of the needles, and wherein the wires are substantially redirected in the plane of the needles; and a guide tube that passes substantially perpendicularly through the adjacent parallel planes of the needle supports to guide the wires to the plane of the needles.

* * * * *